Dec. 11, 1962   J. E. SULLIVAN   3,067,824
GEARED PROPELLER
Filed Nov. 8, 1960   2 Sheets-Sheet 1
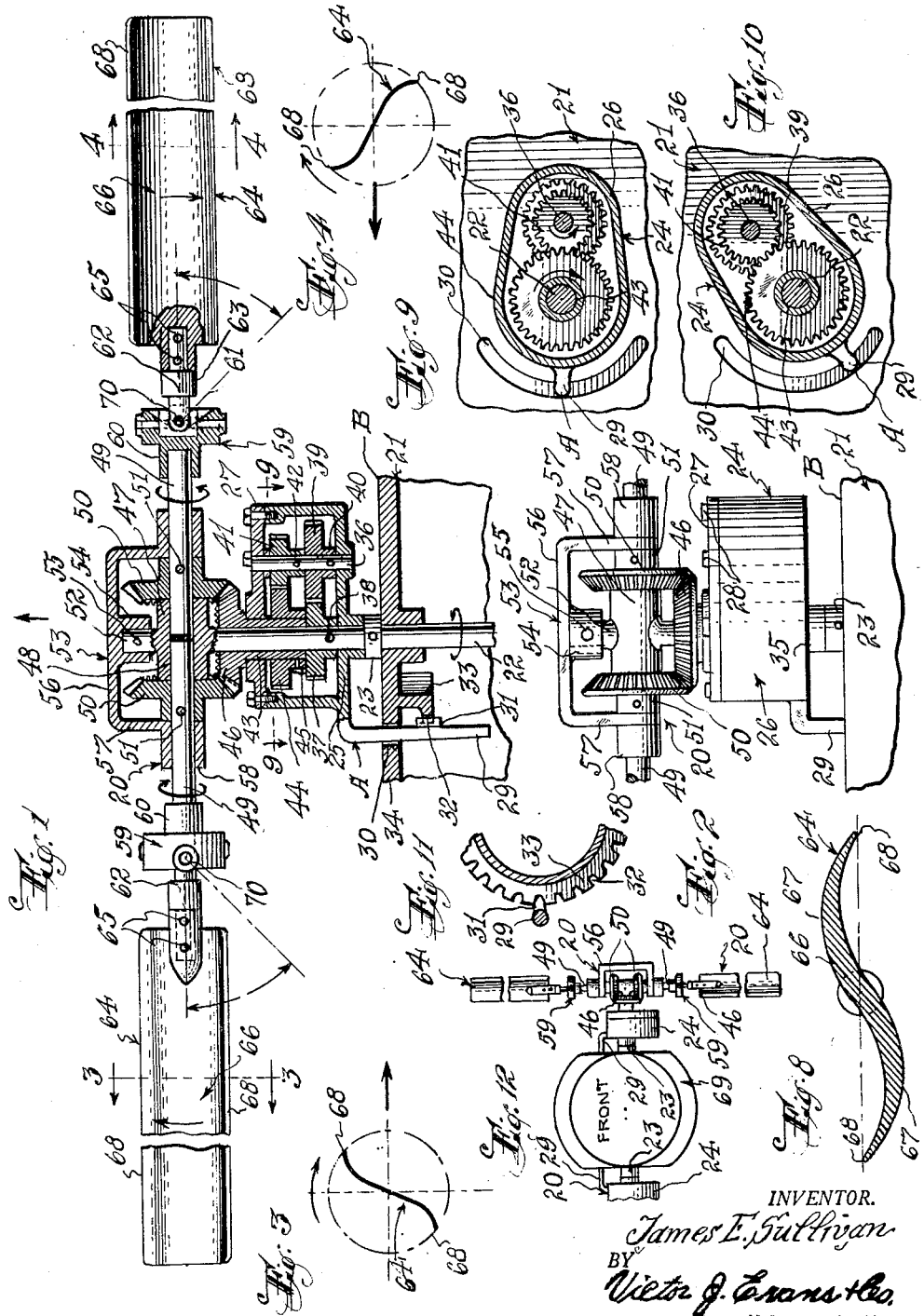
INVENTOR.
James E. Sullivan
BY
Victor J. Evans & Co.
ATTORNEYS.

Dec. 11, 1962   J. E. SULLIVAN   3,067,824
GEARED PROPELLER
Filed Nov. 8, 1960   2 Sheets-Sheet 2
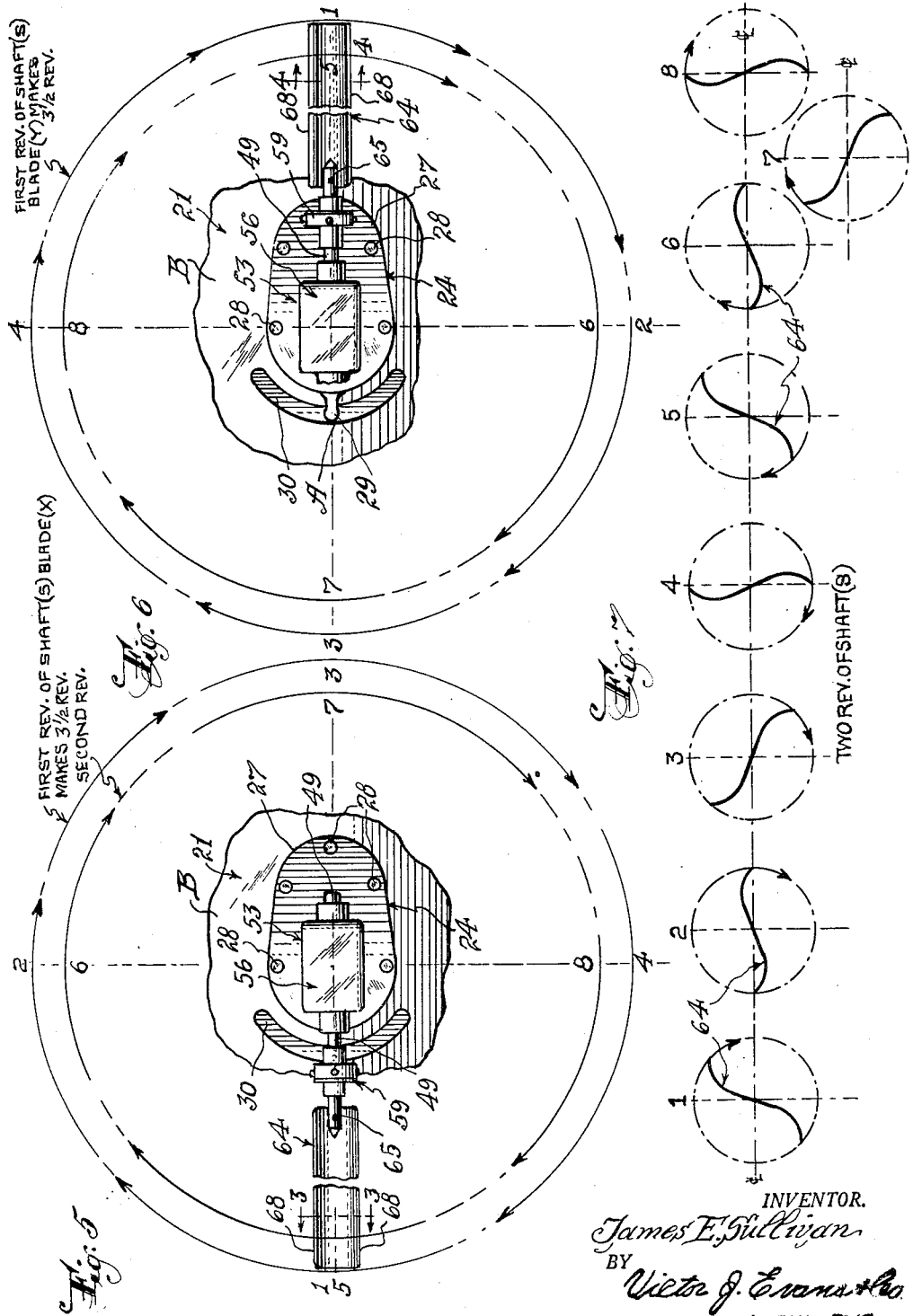
INVENTOR.
James E. Sullivan
BY
Victor J. Evans & Co.
ATTORNEYS.

United States Patent Office 3,067,824
Patented Dec. 11, 1962

3,067,824
GEARED PROPELLER
James E. Sullivan, 4 Annadale Ave., Mansfield, Ohio
Filed Nov. 8, 1960, Ser. No. 68,051
3 Claims. (Cl. 170—135)

This invention relates to propellers such as propellers for aircraft, and more particularly to propellers which are capable of providing thrust and lift in a highly effective and efficient manner.

The primary object of this invention is to provide a geared propeller for use with aircraft such as aircraft of the helicopter type, and wherein the propeller of the present invention can be actuated from a suitable motor, engine or the like so that the aircraft can be given thrust in a desired direction, and wherein the propeller includes blades that have their pitch automatically adjusted as the propeller rotates so as to utilize in the most advantageous fashion the beneficial effects of having the blades arranged so that their pitch will provide the maximum amount of thrust and lift for the aircraft, or other member on which the propeller is being used.

Still another object is to provide such a geared propeller which will provide maximum lift with minimum horsepower requirements, and wherein the propeller can be used for lifting vertically as for example a helicopter can be lifted vertically, and in addition the propeller will provide thrust as in a conventional propeller driven aircraft, and wherein the geared propeller of the present invention includes blades that are adapted to pivot to a generally downward vertical position when the propeller is not actuated so that a minimum amount of space will be occupied or required by the aircraft when the aircraft is not being used.

A further object is to provide a geared propeller of the type stated that is economical to manufacture and efficient in operation and which is rugged in structure and foolproof in use.

These and other objects of the invention will become apparent from a reading of the following specification and claims, taken with the accompanying drawings, wherein like parts are referred to and indicated by like reference characters and wherein:

FIGURE 1 is an elevational view of the geared propeller of the present invention, and with parts broken away and in section.

FIGURE 2 is a fragmentary elevational view showing the intermeshing bevel gears and certain of the associated parts.

FIGURE 3 is a sectional view taken on the line 3—3 of FIGURE 1.

FIGURE 4 is a sectional view taken on the line 4—4 of FIGURE 1.

FIGURES 5 and 6 are diagrammatic views illustrating the movement of the blades as the propeller is actuated.

FIGURE 7 is a schematic or diagrammatic view illustrating the different positions of the blades corresponding to the numbered positions shown in FIGURES 5 and 6 and illustrating the changing pitch of the blades as the propeller rotates.

FIGURE 8 is an enlarged cross-sectional view taken through one of the blades.

FIGURE 9 is a sectional view taken on the line 9—9 of FIGURE 1.

FIGURE 10 is a view similar to FIGURE 9 but showing an adjusted position of the parts as for example when the aircraft is being steered.

FIGURE 11 is a fragmentary sectional view illustrating the locking mechanism for holding the control lever stationary in an adjusted position.

FIGURE 12 is a fragmentary plan view of a modification showing the geared propeller being used on a conventional aircraft.

Referring in detail to the drawings, and more particularly to FIGURES 1 through 11 of the drawings, the numeral 20 indicates the geared propeller of the present invention which is shown being used with a body member 21 that may form part of an aircraft such as a helicopter, and the numeral 22 indicates a drive shaft which extends through a wall 34 of the body member 21, and the drive shaft 22 is adapted to be driven or rotated in any suitable manner, as for example by means of a suitable engine, motor or the like. As shown in FIGURE 1 for example, a collar 23 in pinned or otherwise secured or affixed to the shaft 22 outside of the body member 21, and the numeral 24 indicates a transmission housing which includes a base 25 that is provided with a bushing 35 through which extends the shaft 22, and the housing 24 further includes a wall portion 26 which has a cover plate 27 connected thereto as for example by means of securing elements 28.

The numeral 29 indicates a control lever which is suitably affixed to or formed integral with the housing 24, and the lever 29 is mounted for adjustable movement through a slot 30 in the wall 34 of the body member 21. A tooth or pawl 31 on the lever 29 is adapted to engage teeth or notches 32 in a bar 33 that is suitably connected to the wall 34 whereby the parts 31 and 32 will coact to provide a locking means for maintaining the lever 29 immobile in its various adjusted positions. However, the lever 29 can be readily moved in order to disengage the tooth 31 from the notches 32 as for example when the lever 29 is to be shifted to a different position, and this lever 29 is adapted to be used for steering the aircraft, as later described in this application.

The numeral 36 indicates a pin or stub shaft which extends between the base 25 and cover plate 27, FIGURE 1. A first spur gear 37 is affixed to the drive shaft 22 as at 38, and the first spur gear 37 meshes with a second spur gear 39, and the second spur gear 39 is secured or affixed to the pin 36 as at 40. The numeral 41 indicates a gear member which is affixed to the pin 36 as at 42, and the gear member 41 has its teeth meshing with the teeth of an enlarged gear wheel 44, the gear wheel 44 being affixed as for example by means of a key 45 to a sleeve 43, and the sleeve 43 is rotatably or loosely mounted on the drive shaft 22.

The outer end of the drive shaft 22 is provided with a fitting 47, and the fitting 47 has a longitudinally extending bore 48 therein. The numeral 49 designates each of a pair of opposed driven shafts which has their inner ends arranged in the bore 48 of the fitting 47, and a pair of spaced apart beveled gears 50 are affixed to the driven shafts 49 as at 51, the pair of beveled gears 50 meshing with the bevel gear 46 of the sleeve 43.

The fitting 47 includes an extension or shank 52, and the numeral 53 indicates a bracket or casing which includes a connecting portion 56 that has a bushing 54, and the bushing 54 is affixed to the extension 52 as at 55. The bracket 53 further includes end portions 57 which are provided with bushings 58 for the projection therethrough of the driven shafts 49.

Universal joints 59 are arranged on the outer ends of the driven shafts 49, and these universal joints 59 include elements 60 which are suitably secured to the shafts 49, there being blocks 62 pivotally connected to the elements 60 as at 63, and the elements 60 are provided with flaring or tapered surfaces 61 that provide clearance while permitting the blades 64 to assume a generally vertical position when the propeller is not actuated so that an aircraft equipped with the propeller of the present invention will occupy a minimum amount of space when the same is not being used. The blades 64 are affixed as at 65 to elements 63, and these elements 63 are connected to the blocks 62 and form part of the universal joints 59.

As shown in FIGURE 8 for example, the blades 64 have a construction which includes generally intermediate widened or thickened portions 66 as well as oppositely curved sections 67 and tapered thin outer edges 68, so that the blades 64 have the shape of a compound curve.

In FIGURES 1 through 11 the geared propeller 20 is shown being used on a member 21 which may be a helicopter or the like, while in FIGURE 12 the geared propeller is shown mounted on the sides of a conventional aircraft 69.

From the foregoing, it is apparent that there has been provided a geared propeller which is adapted to be used with various types of structures such as aircraft of the helicopter type or aircraft of the conventional type, and with the parts arranged as shown in the drawings and in particular as shown in FIGURES 1 through 11, it will be seen that the body member 21 which may include the structure such as the cabin of a helicopter, is adapted to have a suitable power mechanism therein or thereon so that the drive shaft 22 can be rotated on such a power source or engine. As the drive shaft 22 is rotated, the gear 37 will be turned or rotated since the gear 37 is connected to the shaft 22 as at 38. The gear 37 meshes with the teeth of the gear 39, and since the gear 39 is affixed as at 40 to the shaft or pin 36, it will be seen that the pin 36 will be rotated as the shaft 22 is rotated, and in view of the fact that the gear 41 is affixed as at 42 to the pin 36, this will rotate the gear 41 which in turn will rotate the gear 44 which meshes with the gear 41. The gear 44 is keyed or affixed as at 45 to the sleeve 43, and the sleeve 43 is free to rotate on the shaft 22. As the sleeve 43 rotates, it turns its bevel gear 46, and since the teeth of the bevel gear 46 mesh with the teeth of the pair of beveled gears 50, it will be seen that this will result in rotation of the pair of beveled gears 50. The beveled gears 50 are affixed as at 51 to the pair of separate driven shafts 49, whereby the driven shafts 49 will be rotated. The blades 64 are connected to the driven shafts 49 through the medium of the universal joints 59, so that as the shafts 49 rotate, the pair of blades 64 will likewise be rotated.

It is to be noted that the shaft 22 has on its outer or upper end the fitting 47 which is provided with the bore 48, and the inner ends of the driven shafts 49 are seated in this bore 48, whereby as the shaft 22 rotates, the fitting 47 will turn and this will rotate the pair of driven shafts 49 with the blades 64 thereon. At the same time that these driven shafts 49 are being turned about an axis extending through the driven shaft 22, the blade 64 will be continuously turned so that the pitch of these blades 64 will be automatically and continuously adjusted or varied as the blades are rotating. Thus, the action of the shaft 22 in rotating the fitting 47 causes rotation of the shafts 49 and blades 64 about an axis extending through the shaft 22, while the provision of the intermeshing gears such as the gears in the transmission housing 24 and the intermeshing bevel gears 46 and 50 serve to insure that the blades 64 will continually rotate or pivot about an axis extending through the driven shafts 49 and this will provide the desired automatic pitch adjustment for the propeller as the blades are being rotated about an axis extending through the shaft 22. Due to the automatic pitch adjustment, the blades will assume or occupy a position so that the maximum amount of lift or thrust can be accomplished and wherein the minimum amount of horsepower will be required for driving the shaft 22.

In addition, the lever 29 can be moved in any suitable manner and as the lever 29 is moved through the slot 30, the transmission housing 24 to which it is affixed will also be moved as for example the housing 24 can be moved to or from a position such as that shown in FIGURES 9 or 10 and this movement of the control lever 29 can be used as a method of steering the aircraft to which the geared propeller 20 is attached.

In the arrangement of FIGURES 1 through 11 the geared propeller 20 is shown mounted on a body member 21 which may be part of a helicopter or the like, while in FIGURE 12 the geared propeller is shown on a conventional aircraft and the construction of the geared propeller of FIGURE 12 is generally the same as that shown in FIGURES 1 through 11.

The bar 33 with the notches 32 functions as a latching or locking mechanism since the notches 32 are adapted to receive therein the tooth 31 of the control lever 29, and this arrangement serves to hold the control lever immobile in its various adjusted positions. However, the control lever 29 may have a slight flexibility so that by applying proper and sufficient pressure thereto the tooth 31 can be removed from a notch 32 in order to permit movement of the control lever 29 to the desired location or position.

The universal joint 59 is constructed so as to include the element 60 which is provided with the tapered surface 61 and this tapered or flaring surface 61 provides clearance whereby the block or member 62 can pivot downwardly on its pivot pin 70 so that when the geared propeller is not actuated, the blades 64 can hang down in a generally vertical position due to gravity and this will provide a means whereby the geared propeller will require a minimum amount of space when the same is not being used. However, when the geared propeller is actuated and when the shaft 22 has power applied thereto, the blades 64 will assume the outward or extended position as for example as shown in FIGURE 1 due to the action of centrifugal force.

The parts can be made of any suitable material and in different shapes or sizes.

When the geared propeller is not actuated, the blades 64 will assume the generally vertical position due to the provision of the universal joints 59, but when the geared propeller is being used, the blades 64 will be maintained in their extended position as shown in FIGURE 1 by centrifugal force.

It is to be noted that according to the present invention a means has been provided for automatically varying the pitch angle of the blades during use or operation thereof so that most efficient performance can be realized from the propeller. The pitch angle is automatically varied during the revolution of the propeller so that in effect the propeller is rotated or oscillated and at the same time the pitch of the blades is continuously changed in order to provide maximum efficiency.

While the present invention has been sufficiently described for use in connection with aircrafts, it is to be understood that the geared propeller of the present invention is not limited to such aircraft and may be used wherever propellers are feasible. The geared propeller can be used as a sustaining type of rotor as for example for a helicopter, and wherein the geared propeller will provide lift as well as thrust.

When the control lever or handle 29 is in the position such as that shown in FIGURE 10 and the blade is in position 2 as shown in FIGURE 7, there will be thrust. FIGURE 5 shows the position of a blade as it makes two revolutions, and FIGURE 6 shows the blade on the other side as it revolves around, and FIGURE 7 indicates how the blade revolves, and the numbers on FIGURE 7 correspond to the different positions as numbered on FIGURES 5 and 6. As the propeller continues up the left side as in FIGURE 5 the thrust will tend to diminish or disappear. When the blade reaches its peak of thrust, the side of the blade that gives the thrust will start to go in reverse. When the blades make a half revolution they are going one way. The next half they will be going in the opposite direction. Even though the blades are rotating, the reversing at each half revolution of the blades will be accomplished. The geared propeller will provide thrust in the upright position and no lift. The geared propeller will give lift plus thrust in the different position.

Two propellers 64 are required for the balance and these move in opposite directions and the use of one propeller would cause vibrations to be present and such vibrations are minimized by using two propellers. The movement of the lever 29 is used for steering the machine to which the geared propeller is attached. The transmission housing 24 turns only when the control lever 29 is turned and the housing 24 is free to ride on the shaft 22.

There is a two to one ratio between the large gear 44 and the small gear 41. The gears 37 and 39 are of the same size. Suitable bearings, braces and the like can be used wherever desired or required, and in addition washers can be interposed or positioned between various parts when needed.

The blades 64 are adatped to rotate at one-half the speed of the drive shaft 22, and when the drive shaft 22 rotates, the spur gear 37 rotates as previously stated, and due to the two to one ratio between the gears 44 and 41 the proper speed of rotation of the blades will be effected. The bevel gear 46 and large gear 44 are free to float on the shaft 22, and as the propeller shafts 49 rotate, the blades 64 will turn in opposite directions, and these blades are timed to turn to a flat position at the same point at every revolution. The control lever 29 is affixed to the transmission housing 24, and when the housing is turned by means of the control lever as for example from a position shown in FIGURE 9 to the position shown in FIGURE 10 the pitch of the blades will be changed so that steering can be accomplished.

It is to be noted that according to the present invention two blades are mounted in such a manner that they turn in opposite directions and these blades are synchronized to turn to the flat spot on opposite sides at exactly the same time and this is brought about by means of the transmission on the shaft 22 which utilizes the bevel gears to turn the two shafts 49 in opposite directions.

The flatter the blade at a particular point, means that the blade will provide more lift at that time or point, and each blade lifts each time the blade rotates around in the proper direction but only one blade lifts at a time. The universal joints help minimize vibration from the blades. If desired more than one geared propeller can be mounted on the same drive shaft to counter-balance any vibration which may be present. Since the blades change sides each time they rotate, the universal joint is provided to permit this movement. The blades 64 are prevented from moving up or down out of their proper position by centrifugal force. In actual use of the device each blade or wing moves in opposite directions and the construction of the blades are as shown in FIGURES 3, 4 and 8. This construction insures that aircraft or the like will be able to derive the maximum thrust or lift with the greatest efficiency and with the least horsepower requirements. The rotation of the pair of blades in opposite directions causes the lift or thrust.

The geared propeller can be used for providing thrust to the right or left, and up or down and directional control is accomplished by properly moving the control lever 29.

By curving the blades 64 in opposite directions as shown in FIGURE 8, increased thrust will be provided, and as previously stated the propeller changes pitch as it rotates, and when the propeller arrives at its highest pitch, it lifts and pushes to the right or left depending on the position of the control lever.

Some of the further advantages of the present invention are as follows. More lift with less horsepower is possible, and the geared propeller can be made to lift vertically as a helicopter. In addition, less space is needed because of the propellers or blades assuming a normal vertical position when the shaft 22 is not rotating.

With further reference to FIGURES 5, 6 and 7 of the drawings, the propeller of the present invention will closely simulate actual bird flight. In FIGURE 5 the wing is being raised with the rear of the wing lowering and the front raising. On this side there is no lift or thrust. When the wing reaches the top of FIGURE 5 and starts its descent as in FIGURE 6, it begins to give thrust or lift as a bird gives thrust and lift in flight by the up and down motion of the bird's wings. In the geared propeller as shown in FIGURE 6 the wing is curved towards the way the propeller is going, cutting in more and more resistance until it reaches the peak of resistance from air. Then the air resistance disappears as the propeller starts back up the other side. It is to be noted that one propeller is cutting in resistance while the other one is cutting it out and at the peak of air resistance when it reverses the air resistance drops almost to zero practically instantly.

The propeller is constructed so that it can be used for selectively providing lift and thrust and the propeller operates by cutting in the air resistance, and the cutting out of air resistance, and it does not work as a screw-type propeller.

Referring to FIGURE 8 the reason for the curved propeller is the rotation of the propeller. The curvature of the propeller is provided because of the rotation of the wings and the wings are hitting the air as they rotate.

As shown in FIGURE 12, one of the geared propellers 20 is adapted to be arranged adjacent each side portion of a conventional aircraft 69. As stated previously the propeller does not work as a screw-type propeller, since the propeller of the present invention cuts the air resistance in and out of each revolution.

Minor changes in shape, size and rearrangement of details coming within the field of invention claimed may be resorted to in actual practice, if desired.

What is claimed is:

1. A geared propeller comprising a body member, a drive shaft extending from said body member, a transmission housing having said shaft extending therethrough, a pin mounted in said housing, a first spur gear arranged in said housing and said spur gear being affixed to said shaft, a second spur gear affixed to said pin and said second spur gear meshing with said first spur gear, a gear member affixed to said pin, a sleeve rotatably mounted on said drive shaft, a gear wheel keyed to said sleeve and said gear wheel meshing with said gear member, said gear wheel being larger than said gear member and there being a two to one ratio between the gear wheel and gear member, a first bevel gear on said sleeve, a fitting on the end of said drive shaft and said fitting having a bore therein, a pair of opposed driven shafts having their inner ends arranged in said bore, a pair of spaced apart bevel gears meshing with the bevel gear on said sleeve, and said pair of bevel gears being affixed to said driven shafts, an extension on said fitting, a bracket including a connecting portion provided with a sleeve which is affixed to said extension, said bracket further embodying end portions having opposed sleeves for the projection therethrough of said driven shafts, universal joints on the outer ends of said driven shafts, and blades connected to said universal joints.

2. The structure as defined in claim 1 and further including a control lever connected to said housing, a locking bar for coaction with said control lever, said body member having a slot for the projection therethrough of said lever.

3. The structure as defined in claim 1 wherein each of said blades includes oppositely curved sections, and said blades having intermediate portions of increased thickness and edge portions of reduced thickness and size.

References Cited in the file of this patent

UNITED STATES PATENTS

| | | |
|---|---|---|
| 1,863,582 | Park | June 21, 1932 |
| 1,957,739 | Szafranski | May 8, 1934 |
| 2,517,282 | Bruel | Aug. 1, 1950 |
| 2,759,494 | Honegger | Aug. 21, 1956 |
| 2,966,317 | Ramniceanu | Dec. 27, 1960 |

FOREIGN PATENTS

| | | |
|---|---|---|
| 554,005 | Great Britain | June 15, 1943 |
| 993,914 | France | Apr. 3, 1951 |